H. CORRIGAN.
FRUIT PICKER.
APPLICATION FILED APR. 11, 1908.
901,594.
Patented Oct. 20, 1908.
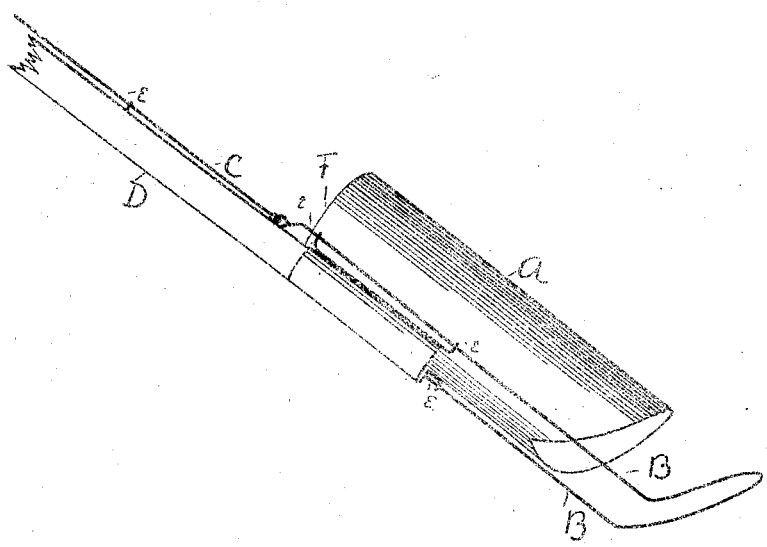
Witnesses,
Everitt Kittredge
James H. Johnson
Inventor,
Hugh Corrigan

UNITED STATES PATENT OFFICE.

HUGH CORRIGAN, OF BRADFORD, NEW HAMPSHIRE.

FRUIT-PICKER.

No. 901,594.  Specification of Letters Patent.  Patented Oct. 20, 1908.

Application filed April 11, 1908. Serial No. 426,627.

*To all whom it may concern:*

Be it known that I, HUGH CORRIGAN, a citizen of the United States, residing at Bradford, in the county of Merrimack and State of New Hampshire, have invented a new and useful Fruit-Picking Machine, of which the following is a specification.

My invention enables the user to gather fruit from branches of a tree that are not otherwise easily accessible. I accomplish this by the mechanism illustrated in the accompanying drawing, in which A, is a metal cylinder of sufficient size to hold a quantity of the fruit to be gathered and suitably attached to pole D; BB, is a wire sliding in eyes *eee*, &c., and so curved that when pulled by sliding rod C, it just clears the metal cylinder A, on the outside, and neatly separates the fruit from the branch. D, is a pole 10 feet long to which rod C, is attached by screw-eyes *eee* &c. The metal cylinder A, has a bottom F, making said barrel a receptacle for the fruit as it falls from the branch.

I claim:

1. The combination of a metal cylinder with a sliding metal looped rod, and a pole to which the cylinder is suitably attached, the loop portion of the rod being bent to extend over the end of the cylinder, substantially as set forth.

2. The combination of a cylinder with a looped rod sliding outside and lengthwise of said cylinder, the looped portion being bent to extend over the end of the cylinder to separate the fruit from its support, and allow it to fall into said cylinder, all substantially as set forth.

HUGH CORRIGAN.

Witnesses:
JAMES H. JOHNSON,
EDWARD C. MESSER.